H. F. DETERDING.
AUTOMATIC ADJUSTER FOR SEEDING MACHINES.
APPLICATION FILED JUNE 10, 1905. RENEWED NOV. 19, 1907.
912,825.
Patented Feb. 16, 1909.
2 SHEETS—SHEET 1.
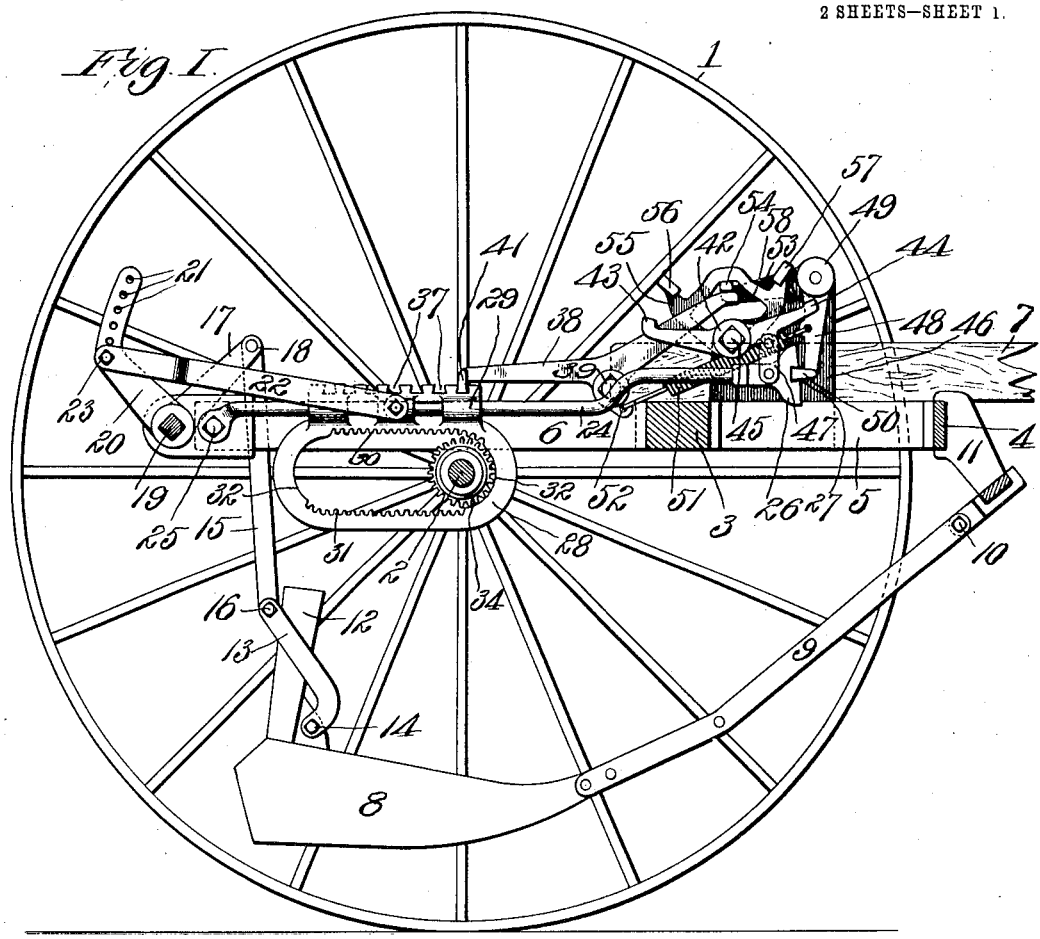
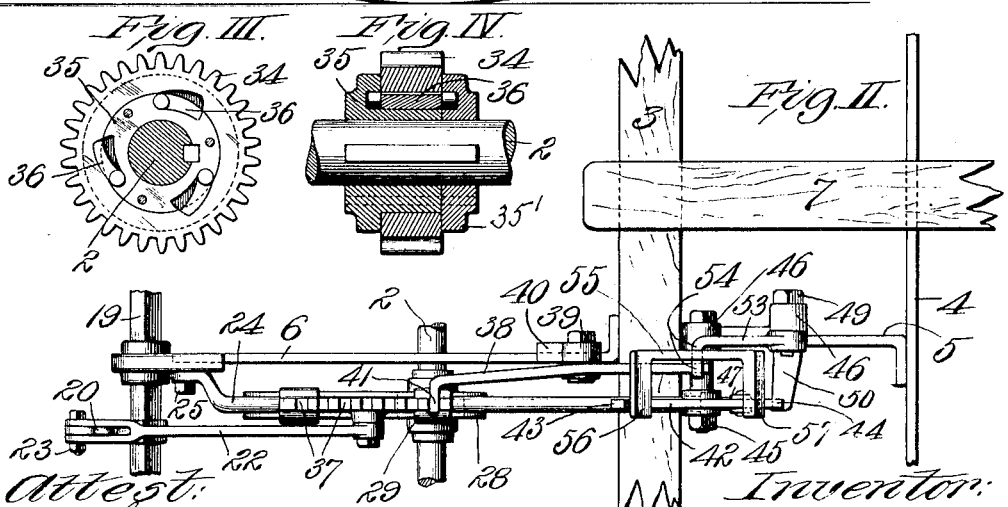

H. F. DETERDING.
AUTOMATIC ADJUSTER FOR SEEDING MACHINES.
APPLICATION FILED JUNE 10, 1905. RENEWED NOV. 19, 1907.
912,825.
Patented Feb. 16, 1909.
2 SHEETS—SHEET 2.
Fig. V.
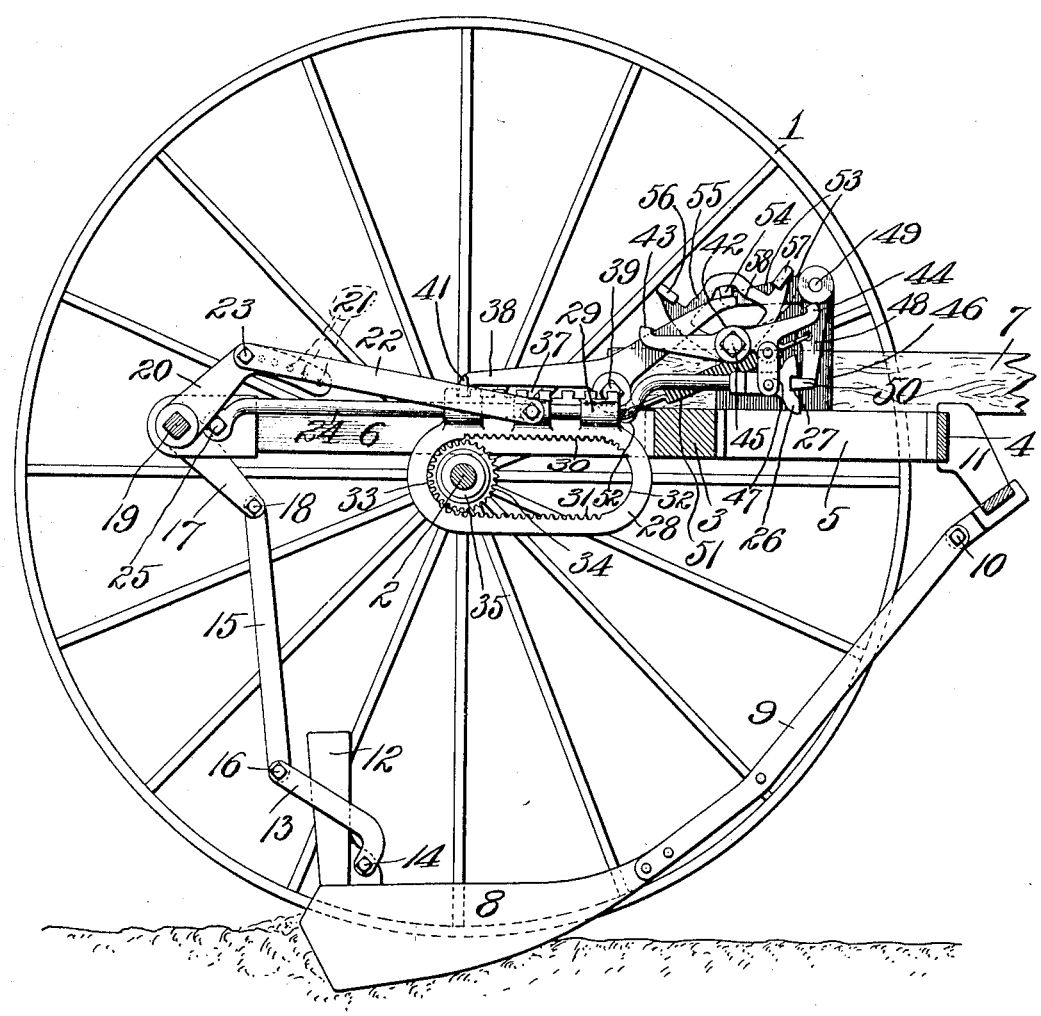
Attest:
Wm. H. Scott
J. M. Hynkoop
Inventor:
H. F. Deterding,
by Wright Bro
Attys

UNITED STATES PATENT OFFICE.

HENRY F DETERDING, OF ST. LOUIS, MISSOURI.

AUTOMATIC ADJUSTER FOR SEEDING-MACHINES.

No. 912,825.           Specification of Letters Patent.        Patented Feb. 16, 1909.

Application filed June 10, 1905, Serial No. 264,580. Renewed November 19, 1907. Serial No. 402,911.

*To all whom it may concern:*

Be it known that I, HENRY F. DETERDING, a citizen of the United States, residing in the city of St. Louis, in the State of Missouri, have invented certain new and useful Improvements in Automatic Adjusters for Seeding-Machines, of which the following is a full, clear, and exact description, reference being had to the accompanying drawings, forming part of this specification.

My invention relates to means for automatically lowering and raising the furrow openers of seeding machines while the machines are in motion.

Figure I is a side elevation illustrating my improvement applied to a seeding machine, shown partly in elevation and partly in longitudinal section. Fig. II is a top or plan view of my adjuster. Fig. III is an enlarged side elevation of the axle carried pinion through the medium of which the adjuster is actuated during the rotation of the seeding machine axle, with the side plate of the clutch within said pinion removed. Fig. IV is a longitudinal section taken through the pinion and clutch illustrated in Fig. III and Fig. V is a side elevation showing the furrow opener in its lowered position.

1 designates one pair of ground wheels and 2 the axle of the machine which is rigidly mounted in one or both of the ground wheels. The axle 2 supports a frame which includes suitable side members, a transverse member 3 located forward of the members, a transverse tie-bar 4 located in front of said transverse member 3 and longitudinally extending bars 5 and 6, the former of which is located between the parts 3 and 4, and the latter of which extends rearwardly from the member 3.

7 is the tongue of the machine which is suitably attached to the frame consisting of the members described.

8 designates a furrow opener that is connected to the transversely extending tie-bar 4 by means of a link 9 that extends upwardly from the forward end of the shoe and is pivoted at 10 to a bracket 11 rigidly attached to said tie-bar. This method of supporting the forward end of the furrow opener provides for its being raised and lowered in the manner hereinafter stated. The furrow opener carries a seed chute 12 into which the seed to be planted may be discharged from a seed box suitably mounted upon the machine.

13 is one of a pair of links which straddle the chute 12 and the lower ends of which are pivoted at 14 to the furrow opener 8 to provide for the raising and lowering of said opener when the links are raised and lowered in the manner to be explained.

15 is a lift bar pivoted at 16 to the links 13 and extending vertically into pivotal connection with a crank arm 17 at 18.

19 is a rocking lift rod that is journaled in the sides of the frame of the machine and by which the crank arm 17 is carried.

20 is a throw-arm fixed to the lift rod 19 and provided with a plurality of perforations 21.

22 is a throw-rod having its rear end connected to the throw-arm 20 by a set-bolt 23 that is adapted to be introduced through either of the perforations 21 in the throw-arm according to the degree of movement it may be desired to impart to the rocking lift rod 19 for the purpose of elevating or lowering the furrow opener when movement is imparted through the medium of the rocking lift rod to the crank arm 17 and the links 15 and 13.

24 is a guide rod pivoted to the bars 6 of the frame of the machine at 25 and extending forwardly from said point. This guide rod bears at its forward free end a head 26 that is provided with a transverse notch 27.

28 designates a rack frame that is provided with perforated ears 29 which are loosely fitted to the guide rod 24, thereby providing for the reciprocation of said rack frame on the guide rod. The rack frame is of elongated shape and upon its interior are upper rack teeth 30 and lower rack teeth 31. At the forward and rear ends of the rack frame and interior thereof are curved smooth faces 32, these faces being located intermediate of the upper and lower rack teeth at the ends of the frame, as seen in Fig. I.

34 designates a pinion that is carried by the axle of the seeding machine and which is preferably in the form of a ring having a recessed interior and rotatably positioned upon a hub 35, which is keyed to the axle. Rotation is imparted to the pinion 34 while the seeding machine is moving forwardly through the medium of clutch fingers 36 rockingly seated in the hub 35 and in an end cap 35' forming a part of said hub. The clutch fingers are adapted to engage in the recesses upon the interior of the pinion 34.

When the seeding machine is moved backwardly the hub on which the pinion 34 is mounted rides idly within said pinion without causing movement of the pinion. The pinion 34 is adapted to ride in engagement with either the rack teeth 30 or 31 at different times, or to ride intermediate of said rack teeth at the ends of the rack frame 28 adjacent to one of the plain faced ends of the rack frame, as will hereinafter be explained. At the upper side of the rack frame 28 is a series of notches 37.

38 is a dog pivotally attached at 39 to a bracket 40 carried by the frame bars 6. The rear end of this dog is provided with a finger 41 that is adapted to enter into the notches 37 in the rack frame.

42 designates a rocking bar having a rear arm 43 and a forward arm 44. This rocking bar is supported by a pivot-bolt 45 mounted in a bracket 46 carried by one of the frame bars 5. The rocking bar is united to the head 26 of the guide rod 24 by a link 47 through the medium of which said rod may be raised and lowered when the rocking bar is rocked.

48 designates a dog fixed to a rocking rod 49 and provided with a tooth 50 that is adapted to engage in the notch 27 of the guide rod head 26 to hold said guide rod in an intermediate position of elevation.

51 is a retractile spring having one of its ends secured to the dog 48 and its other end connected at 52 to the dog 38. The tendency of this spring is to hold the dog 48 in engagement with the guide rod head 26 and the finger 41 of the dog 38 seated in one of the notches 37 of the rack frame 28.

53 is a trip arm fixed to the rocking rod 49 and through the medium of which the dog 48 also carried by said rod is actuated to free the finger of said dog from the guide rod head 26. The trip arm 53 terminates in a laterally projecting finger 54 that rests upon the forward end of the dog 38.

55 is a treadle rockingly mounted upon the pivot bolt 45 and having laterally extending rear and forward foot-receiving arms 56 and 57 that project over the arms 43 and 44 of the rocking bar 42 so that when the treadle is rocked, one of said foot-receiving arms will be lowered to one of the arms of said rocking bar. The treadle 55 is apertured for the entrance of the finger 54 of the trip arm 53 thereinto and the upper portion of the treadle between the foot-arms 56 and 57 is formed into cams 58 that ride in engagement with the trip arm finger when the treadle is rocked to and fro so that said trip arm will be oscillated to actuate the dog 48.

In the practical use of a seeding machine equipped with my furrow opener adjusting mechanism, the operation is as follows: the operator of the machine rides upon the lid of the seed box or on a suitable seat supported by the frame of the machine not shown so positioned that he may readily place one of his feet upon either of the arms of the treadle 55. It will first be assumed that the parts are in the positions seen in Figs. I and II, and that it is desired to lower the furrow opener. The operator first places his foot upon the forward foot-arm 57 and exerts downward pressure thereon, thereby causing the rear portion of the cam 58 of the treadle to ride against the finger 54 of the trip arm 53, which extends to the interior of the treadle as stated. As the cam rides against said finger it forces the trip arm downwardly and due to the dog 48 being fixed to the rocking rod 49 by which the trip arm is carried, said dog is swung forwardly, thereby retracting its tooth 50 from the notch in the guide rod head 26 to free the guide rod 24. At the same time that the trip arm 53 acts to throw the dog 48 out of engagement with the guide rod head it presses downwardly upon the forward arm of the dog 38 and raises the rear arm of said last named dog to withdraw its finger 41 from the position it previously occupied in one of the notches 37 of the rack frame 28. After the described parts have been actuated by the trip arm the treadle arm 57 continues its downward movement until it strikes against the forward arm 44 of the rocking bar 42. When the engagement of these parts occurs the forward rocking bar arm is depressed and it acts, through the medium of the link 47 connecting it to the guide rod head, to depress the guide rod 24. It is to be noted at this point that at the time the dog 48 is withdrawn from engagement with the guide rod head and the guide rod is being lowered as stated, the tooth of said dog rests against the end of the guide rod above the notch therein and serves to hold the dog so disposed as to cause the trip arm 53 to continue its pressure against the rear arm of the dog 38 and hold said dog out of either of the notches of the rack frame 28, thereby permitting longitudinal movement of the rack frame on the guide rod. When the guide rod is lowered, as stated the rack frame 28 is carried downwardly therewith, while the frame is in the position seen in Fig. I, and the teeth of said frame are brought into mesh with the teeth of the pinion 34. As a consequence of the rack frame teeth 30 being placed in mesh with the pinion 34 and rotation being imparted to said pinion, upon rotation of the seeding machine axle by which it is carried, the rack frame is reciprocated forwardly on the guide rod 24 during the forward movement of the machine. As the rack frame is so reciprocated, it acts to exert a pull upon the throw-rod 22 and throw-arm 20, as a result of which the rocking lift rod 19 is oscillated and the crank arm 17 is swung forwardly to depress the links 13 and 15 and lower the furrow opener 8 to the ground or into the ground to the desired depth. When the rack frame has been reciprocated through the medium of the axle carried pinion and the furrow opener lowered to or into the ground, the plain or untoothed face 32 at the rear end of the rack is brought into engagement with the pinion, with the result that the rack frame is elevated, due to the lessened interior dimension of the rack frame at said untoothed point. As the rack frame is moved upwardly the guide rod 24 is carried therewith and the dog carried pawl 41 again enters into the notch in the guide rod head to hold said guide rod as before during the period of uninterrupted seeding action in the use of the machine. The actuation of the parts to elevate the furrow opener will next be described, it being understood that when the furrow opener is in lowered position the rack frame 28 is in forward position as in Fig. V, so that the pinion 34 rotates adjacent to the untoothed face 32 of said frame. The operator first places his foot upon the rear treadle arm 56 and presses downwardly thereupon to rock the treadle rearwardly with a result that the forward portion of the cam 58 of the treadle rides against the finger of the trip arm 53 and causes said trip arm to actuate the dogs 48 and 38 in the same manner as before to free the guide rod 24 for movement. The continued downward movement of the treadle arm 56 causes it to strike the rear arm 43 of the rocking bar 42, whereby the forward arm of said bar is elevated. The upward movement of the forward rocking bar arm causes the guide rod to be elevated, due to the link connection between said bar and the guide rod head. When the guide rod is elevated, as stated, the rack frame is lifted therewith and the lower teeth 31 of the rack frame are brought into mesh with the teeth of the axle carried pinion so that said pinion will act to impart reciprocation to the rack frame in a forward direction, thereby causing said rack frame to exert a pull upon the parts connected thereto and elevate the furrow opener from the ground.

It will be seen that the throw imparted to the throw-arm 20 may be varied at will to lower the furrow opener into the ground to a greater depth by changing the point of pivotal connection of the throw-rod 22 to said arm toward the outer end of the arm and when it is desired to decrease the degree of lowering of the furrow opener the point of such pivotal connection may be changed inwardly. As hereinbefore stated, the pinion 24 is in the form of a ring and is rotatably positioned upon the hub 35, with which engagement is provided through the medium of clutch fingers 36. These clutch fingers serve to connect the pinion ring to its hub so that the axle of the machine will be caused to drive said ring when the seeding machine is moving in a forward direction. When the mechanism by which the furrow opener of the machine is released to permit the descent of said furrow opener, it falls by gravitation, due to its weight, thereby rocking the lift rod 19 and throwing the throw-arm 20 and the throw-rod 22 in a forward direction to reciprocate the rack frame 28. The teeth 30 of the rack frame being at this time in engagement with the pinion 34, said pinion is caused to rotate upon its hub and ride over the clutch fingers 36 so that the furrow opener will be quickly lowered to the ground without interference by any of the parts of the machine.

I have shown my adjuster mechanism centrally located within a seeding machine to operate as described in such position, but it is obvious that it may be located at either side of the center of the machine and outside of the machine frame instead of interior thereof, without departing in any particular from the spirit of the improvement.

I claim as my invention:

1. The combination with the ground wheels and axle of a seeding machine, of a pinion carried by said axle, a double rack arranged for engagement with said pinion, a furrow opener, a lift member connecting said furrow opener and said rack, and means for moving said rack into and out of engagement with said pinion, substantially as set forth.

2. The combination with the ground wheels and axle of a seeding machine, of a pinion carried by said axle, a double rack arranged for engagement with said pinion, a furrow opener, a lift member connecting said furrow opener and said rack, means for moving said rack into and out of engagement with said pinion, and means for holding said rack in a fixed position while it is out of engagement with the pinion, substantially as set forth.

3. The combination with the ground wheels and axle of a seeding machine, of a pinion carried by said axle, a rack frame provided interiorly with a series of upper teeth and a series of lower teeth arranged for engagement with said pinion, a furrow opener, a lift member connecting said furrow opener and said rack frame, and means for lowering and raising said rack frame, substantially as set forth.

4. The combination with the ground wheels and axle of a seeding machine, of a pinion carried by said axle, a rack frame provided interiorly with a series of upper teeth and a series of lower teeth arranged for engagement with said pinion, a furrow opener, a lift member connecting said furrow opener and said rack frame, means for lowering and raising said rack frame, and means for holding said rack frame in its fixed position while its teeth are out of engagement with said pinion, substantially as set forth.

5. The combination with the ground wheels and axle of a seeding machine, of a pinion carried by said axle, a rack frame inclosing said pinion and having at its interior a series of upper teeth and a series of lower teeth and having untoothed surfaces at its ends intermediate of said upper and lower teeth, and a furrow opener, a lift member connecting said furrow opener and said rack frame whereby it is lowered and raised, substantially as set forth.

6. The combination with the ground wheels and axle of a seeding machine, of a pinion carried by said axle, a rack frame inclosing said pinion and having at its interior a series of upper teeth and a series of lower teeth and having untoothed surfaces at its ends intermediate of said upper and lower teeth, a furrow opener, a lift member connecting said furrow opener and said rack frame whereby it is lowered and raised, and means for holding said rack frame in a fixed position while its teeth are out of engagement with said pinion, substantially as set forth.

7. The combination with the ground wheels and axle of a seeding machine, of a pinion carried by said axle, an interiorly toothed double rack frame surrounding said pinion and arranged for engagement therewith, a guide rod on which said rack frame is reciprocally mounted and a furrow opener, a lift member connecting said furrow opener and said rack frame, substantially as set forth.

8. The combination with the ground wheels and axle of a seeding machine, of a pinion carried by said axle, an interiorly toothed double rack frame surrounding said pinion and arranged for engagement therewith, a guide rod on which said rack frame is reciprocally mounted, a furrow opener, a lift member connecting said furrow opener and said rack frame, and means for lowering and raising said guide rod to place the teeth of said rack frame in engagement with said pinion, substantially as set forth.

9. The combination with the ground wheels and axle of a seeding machine, of a pinion carried by said axle, an interiorly toothed double rack frame surrounding said pinion and arranged for engagement therewith, a guide rod on which said rack frame is reciprocally mounted, a furrow opener, a lift member connecting said furrow opener and said rack frame, means for lowering and raising said guide rod to place the teeth of said rack frame in engagement with said pinion, and means for holding said guide rod in a fixed position when said rack frame is out of engagement with said pinion, substantially as set forth.

10. The combination with the ground wheels and axle of a seeding machine, of a pinion carried by said axle, an interiorly toothed double rack frame surrounding said pinion, a guide rod on which said rack frame is reciprocally mounted, a furrow opener, a lift member connecting said furrow opener and said rack frame, and a treadle for lowering and raising said guide rod to move said rack frame into engagement with and out of engagement with the teeth of said pinion, substantially as set forth.

11. The combination with the ground wheels and axle of a seeding machine, of a pinion carried by said axle, an interiorly toothed double rack frame surrounding said pinion, a guide rod on which said rack frame is reciprocally mounted, a furrow opener, a lift member connecting said furrow opener and said rack frame, a treadle for lowering and raising said guide rod to move said rack frame into engagement with and out of engagement with the teeth of said pinion, and a dog arranged for engagement with said guide rod to hold it in a fixed position, substantially as set forth.

12. The combination with the ground wheels and axle of a seeding machine, of a pinion carried by said axle, an interiorly toothed rack frame surrounding said pinion, a guide rod on which said rack frame is reciprocally mounted, a furrow opener connected with said rack frame, a treadle for lowering and raising said guide rod to move said rack frame into engagement with and out of engagement with the teeth of said pinion, a dog arranged for engagement with said guide rod to hold it in a fixed position, and a dog controlled by said first named dog for engagement with said rack frame, substantially as set forth.

13. The combination with the ground wheels and axle of a seeding machine, of a pinion carried by said axle, an interiorly toothed rack frame surrounding said pinion, a guide rod on which said rack frame is reciprocally mounted, a furrow opener connected with said rack frame, a treadle for lowering and raising said guide rod to move said rack frame into engagement with and out of engagement with the teeth of said pinion, a dog arranged for engagement with said guide rod to hold it in a fixed position, and a dog controlled by said first named dog for engagement with said rack frame; said rack frame being provided with a plurality of notches adapted to receive the dog that engages therewith, substantially as set forth.

14. The combination with the ground wheels and axle of a seeding machine, of a pinion carried by said axle, an interiorly toothed double rack frame surrounding said pinion, a guide rod on which said frame is reciprocally mounted, a furrow opener, a lift member connecting said furrow opener and said rack frame, a rocking bar for oscillating said guide rod, and a treadle for actuating said rocking bar, substantially as set forth.

15. The combination with the ground wheels and axle of a seeding machine, of a pinion carried by said axle, an interiorly toothed rack frame surrounding said pinion, a guide rod on which said frame is reciprocally mounted, a furrow opener connected to said rack frame, a rocking bar for oscillating said guide rod, a treadle for actuating said rocking bar, and a dog controlled by said treadle for engagement with said guide rod, substantially as set forth.

16. The combination with the ground wheels and axle of a seeding machine, of a pinion carried by said axle, an interiorly toothed rack frame surrounding said pinion, a guide rod on which said frame is reciprocally mounted, a furrow opener connected to said rack frame, a rocking bar for oscillating said guide rod, a treadle for actuating said rocking bar, a dog controlled by said treadle for engagement with said guide rod, and a trip arm having connection with said dog and having engagement with said treadle, substantially as set forth.

17. The combination with the ground wheels and axle of a seeding machine, of a pinion carried by said axle, an interiorly toothed rack frame surrounding said pinion, a guide rod on which said frame is reciprocally mounted, a furrow opener connected to said rack frame, a rocking bar for oscillating said guide rod, a treadle for actuating said rocking bar, a dog controlled by said treadle for engagement with said guide rod, and a trip arm having connection with said dog and having engagement with said treadle; said treadle being provided with cams that bear against said trip arm, substantially as set forth.

HENRY F. DETERDING.

In presence of—
 NELLIE V. ALEXANDER,
 BLANCHE HOGAN.